Feb. 18, 1930.  C. R. KIMBLE  1,747,777
AIRCRAFT CONTROL
Filed April 27, 1927
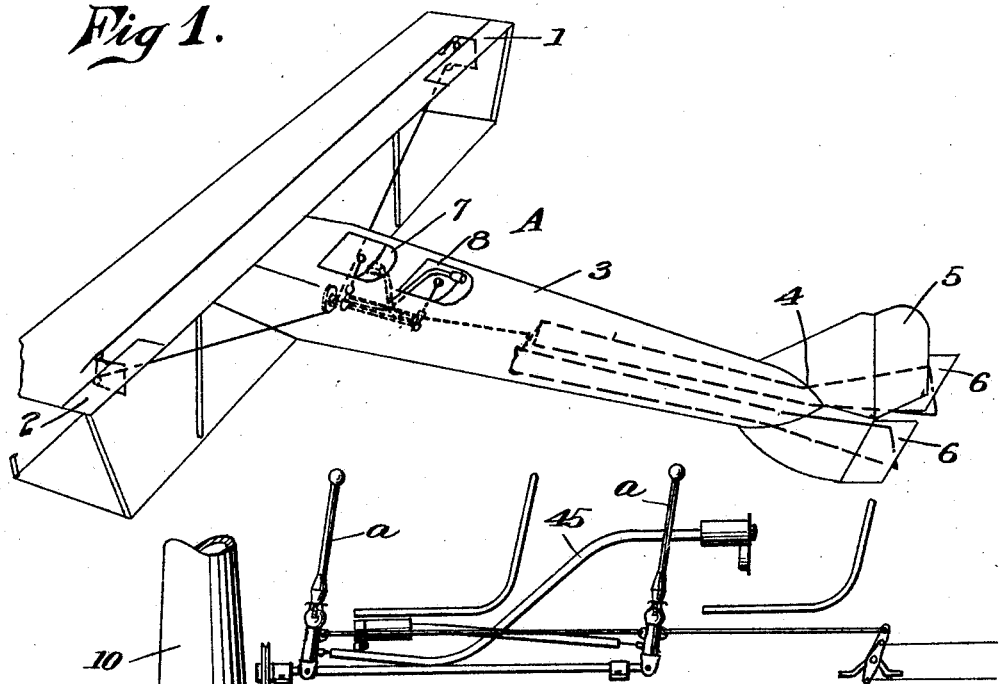
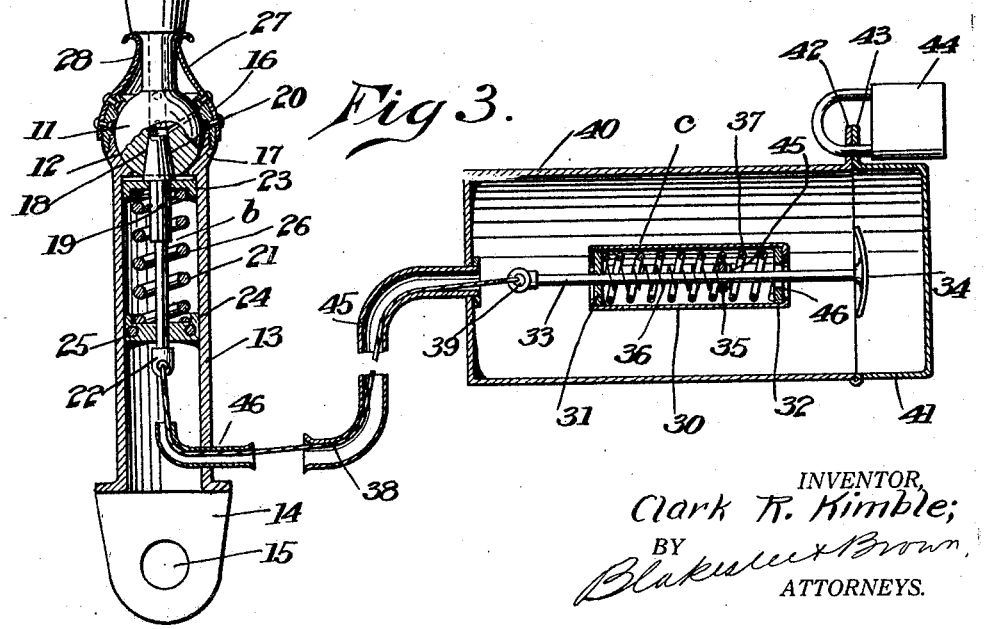
INVENTOR,
Clark R. Kimble;
BY
Blakeslee & Brown
ATTORNEYS.

Patented Feb. 18, 1930

1,747,777

UNITED STATES PATENT OFFICE

CLARK R. KIMBLE, OF ARTESIA, CALIFORNIA, ASSIGNOR TO ROBERT S. THOMPSON, OF BELLFLOWER, CALIFORNIA

AIRCRAFT CONTROL

Application filed April 27, 1927. Serial No. 186,862.

This invention relates to improvements in aircraft controls, and has for an object the provision of a novel device wherein and whereby a given control may be released from operation at the will of the operator of the aircraft. The device is particularly useful in the instructing of students in the operation of aircraft. If for any reason the student should suddenly become frightened and attempt to jam a control, the pilot can release said control and still maintain normal operation of the aircraft.

Another object is the provision of a control which is so constructed as to be readily released from operation, and which control will assume a neutral position after being so released.

Other objects include a control means for aircraft which is simple of construction, foolproof in operation and generally superior.

With the above and other objects in view, the invention consists in the novel and useful provision, formation, construction, association and relative arrangement of parts, members and features, all as shown in a certain embodiment in the accompanying drawing, described generally, and more particularly pointed out in the claim.

In the drawing:

Fig. 1 is a fragmentary perspective view of an airplane, incorporating the invention;

Fig. 2 is an elevation illustrating the general arrangement of the controls with relation to two seats; and Fig. 3 is an enlarged and partially vertical sectional view, detailing the construction of the control means.

Corresponding parts in all the figures are designated by the same reference characters.

Referring now with particularity to the drawing, the airplane shown in Fig. 1 is designated by A, of which 1 and 2 are ailerons, 3 the fuselage, and 4 the empennage, which empennage has the rudder control surface 5 and elevator flaps 6. The nacelle portion of the fuselage in the present instance has two cockpits 7 and 8, arranged in tandem formation.

The present invention has more particularly to do with elevator control, and relates to certain improvements in the lever control, sometimes termed the "joy stick". Such lever control for the elevator is designated as an entirety by $a$, and in the present instance two of said controls are utilized, one in each cockpit. The lever controls $a$ include the lever proper 10 one end of which is provided with a ball member 11, which ball member is adapted to be socketed at 12 in a hollow post 13, which post in turn is provided with two leg portions or a stirrup portion 14. Each leg of the stirrup is formed with a transverse bore 15, and the stirrup is mounted upon a rod associated with the fuselage flooring, whereby the post may be rocked back and forth or sideways, in accordance with the movement of the lever 10. Sideways motion is adapted to actuate the ailerons, and back and forth motion operates the elevator flaps. The socket portion 12 of the post is formed in two parts, as shown at 16 and 17, said parts being adapted to be suitably secured together, as by screw-threading, and when the members 16 and 17 are in assemblage the ball 11 is securely held within said socket portion. The ball 11 is formed with a tapered bore 18. Means designated generally as $b$ is adapted to cooperate as between the post 13 and the said ball 11, to either lock the ball and the post together, or to unlock the two. This means $b$ includes a bolt 19, formed with a tapered head 20, the said bolt being provided with a stem 21 terminating in an eye 22. Within the post is a collar 23, slidable upon the bolt 19, and likewise a collar 24, secured to the post in any suitable manner, such as shown at 25, the stem 21 being passed through the central opening in said collar. A coil spring 26 surrounds the bolt and stem and is interposed between the collars 23 and 24. Normally the spring urges the bolt head within the tapered bore 18, whereby the post and the said ball 11 are locked together. In order to insure that the said head of the bolt would be received within said bore, I have provided a series of leaf springs 27, secured to the part 16, and adapted to bear against a reduced portion 28 of the lever. Thus when the lever 10 is released, assuming that it has been pushed to one side, the leaf springs will immediately move the lever to what is termed a neutral position, which will, of course, permit the head of the bolt to be received within the tapered bore 18.

Means c is utilized for releasing the means b, and said means c has been fully described in my application for improvements in aircraft controls filed in the United States Patent Office contemporaneously with this application. The said means c includes a tubular housing 30, provided with end collars 31 and 32. Passed through the tubular casing and said collars is a pull rod 33, which pull rod carries at one end a hand-hold or lever 34. Attached to this pull rod is a collar 35. Surrounding the pull rod, and interposed between the collars 31 and 35, is a coil spring 36. Likewise surrounding the coil spring 36 is a coil spring 37, which coil spring lies between the collars 31 and 32. A cable 38 is connected to an eye member 39, at one end of the pull rod and eye member 22 of the stem 21.

In the showing of Fig. 3, the device c is within a casing 40, which casing is provided with a hinged cover 41. The casing body and the cover are both provided with lugs 42 and 43, respectively, which lugs are adapted to cooperate when the casing cover is closed, whereby a padlock or similar means 44 may secure said lugs together. I likewise provide metal tubes or the like 45 and 46 for isolating the cable 38.

The operation, uses and advantages of the device just described are as follows:

Assuming that we have elevator controls a in each cockpit, and likewise assuming that a student is being trained, the pilot will sit in the front cockpit and the student in the rear cockpit. If we assume that the student becomes frightened and pulls directly back upon the elevator control lever a, and holds it there, the airplane, if it has a low power engine, will climb to a given point and then commence spinning, or if it does not spin, it may do what is called a "whip stall", then recover and start climbing again. If the engine is of high power, the chances are the plane will loop. In order to overcome this tendency on the part of the pupil, the pilot can immediately release the elevator control by pulling directly outwardly upon the pull rod 33, by grasping the handle 34. It is evident that this will release the bolt from its engagement with the member 11, and the lever 10 can then be moved in different directions without in any way affecting the elevator flaps. Once the student has released the lever 10, the lever will neutralize itself under the urgency of the leaf springs 27, and if the pilot deems it advisable he can then release the pull rod so that the bolt will again engage the member 11. Movement of the elevator control forward or sideways will tend to pull upon the cable 38, and in order that this pull upon the cable may be compensated, so that the bolt will not be released from the part 11, I have provided a weak coil spring 36. Thus the pull rod may move inwardly, the coil spring 26 being sufficient to overcome the resistance offered by the spring 36, and still maintain the bolt within the member 11. The pull rod 33 carries a key 45, and when it is desired to release the bolt 19, the pull rod may be pulled straight outwardly, the key passing through the opening 46, and the collar 32, and then by turning the handle 34, the key is brought to a position whereby it will not again enter through the opening in the collar, and thus maintain the bolt free from the member 11.

In Fig. 2 I have shown diagrammatically an arrangement of the controls with the release control for the lever 10 of the front cockpit arranged in the rear cockpit, and the release control for the rear elevator control, in the front cockpit. Thus the aviator can lock one of the release controls and leave the other one open, the one that is left open, of course, being in the pilot's cockpit.

While this present control has been described with relation to the elevator control, yet it is to be understood that such a system might be readily utilized in conjunction with any other control members of the aircraft.

It is obvious that various changes and variations and modifications may be made in practising the invention in departure from the particular showing, without departing from the true spirit thereof.

Having thus disclosed my invention, I claim and desire to secure by Letters Patent:

In a dual control mechanism for airplanes, a hollow post having a socket formed at the upper end thereof, a spring pressed bolt within the post, a control lever having a reduced portion and a ball at one end and provided with a bore for normally receiving the head of the bolt, a plurality of leaf springs carried by the outer side of the socket formed at the top of the post and having their free ends bearing against the reduced portion of the lever.

In testimony whereof, I have signed my name to this specification.

CLARK R. KIMBLE.